(12) United States Patent
Noh

(10) Patent No.: US 7,999,867 B2
(45) Date of Patent: Aug. 16, 2011

(54) IMAGE EDGE DETECTION APPARATUS AND METHOD, IMAGE SHARPNESS EMPHASIZING APPARATUS AND METHOD, RECORDED MEDUIM RECORDED THE PROGRAM PERFORMING IT

(75) Inventor: Yo-Hwan Noh, Gyeonggi-do (KR)

(73) Assignee: MTekvision Co., Ltd., Seoul (KR)

( * ) Notice: Subject to any disclaimer, the term of this patent is extended or adjusted under 35 U.S.C. 154(b) by 425 days.

(21) Appl. No.: 12/307,054

(22) PCT Filed: Jun. 29, 2007

(86) PCT No.: PCT/KR2007/003163
§ 371 (c)(1),
(2), (4) Date: Dec. 30, 2008

(87) PCT Pub. No.: WO2008/023885
PCT Pub. Date: Feb. 28, 2008

(65) Prior Publication Data
US 2009/0316024 A1 Dec. 24, 2009

(30) Foreign Application Priority Data
Aug. 25, 2006 (KR) ......... 10-2006-0081260

(51) Int. Cl.
*H04N 5/208* (2006.01)
*H04N 5/262* (2006.01)
*H04N 9/64* (2006.01)
*G06K 9/40* (2006.01)

(52) U.S. Cl. ........ 348/252; 348/239; 348/251; 382/266; 382/274; 382/254; 382/264; 382/261

(58) Field of Classification Search ............... 348/252, 348/251, 239, 597, 606, 625, 615; 38/199, 38/266, 269, 263, 254, 274, 260, 264, 261
See application file for complete search history.

(56) References Cited

U.S. PATENT DOCUMENTS

| 5,408,338 | A  | * | 4/1995  | Koike        | 358/448   |
|-----------|----|---|---------|--------------|-----------|
| 5,604,825 | A  | * | 2/1997  | Hirota et al.| 382/261   |
| 5,838,463 | A  | * | 11/1998 | Gahang       | 358/465   |
| 7,072,523 | B2 | * | 7/2006  | Bolle et al. | 382/254   |
| 7,508,422 | B2 | * | 3/2009  | Kamon et al. | 348/229.1 |
| 2002/0122602 | A1 |   | 9/2002  | Rouvellou    |           |
| 2005/0018077 | A1 |   | 1/2005  | De Haan et al.|          |

FOREIGN PATENT DOCUMENTS

| KR | 1998-061048 A     | 10/1998 |
| KR | 2002-0052997 A    | 7/2002  |
| KR | 10-2004-0054758 A | 6/2004  |

* cited by examiner

*Primary Examiner* — Lin Ye
*Assistant Examiner* — Marly Camargo
(74) *Attorney, Agent, or Firm* — Birch, Stewart, Kolasch & Birch, LLP

(57) ABSTRACT

The present invention relates to an apparatus for and a method of providing a sharper image by preventing the deterioration of an image caused by the difference in dynamic ranges of a center part and a surrounding part of the image photographed by an image sensor or by the difference of lens resolution. In accordance with an embodiment of the present invention, an image edge detection apparatus and a method thereof, a sharpness emphasis apparatus and a method thereof, and a recoding medium recorded with a program performing the method can acquire the sharpness and quality of a desired image by detecting an edge of a surrounding part by use of an edge detection filter having a different filter area size and/or a weight of a computed edge value in a center part and the surrounding part, respectively, of the image, and then by giving a weight to the detected edge.

22 Claims, 9 Drawing Sheets

IMAGE EDGE DETECTION APPARATUS AND METHOD, IMAGE SHARPNESS EMPHASIZING APPARATUS AND METHOD, RECORDED MEDUIM RECORDED THE PROGRAM PERFORMING IT

CROSS-REFERENCE TO RELATED APPLICATIONS

This application claims foreign priority benefits under 35 U.S.C. .stn. 119(a)-(d) to PCT/KR2007/003163, filed Jun. 29, 2007, which is hereby incorporated by reference in its entirety.

BACKGROUND

1. Technical Field

The present invention relates to an image sensor, more specifically to an apparatus and a method of providing a sharper image by preventing the deterioration of the image caused by the difference in dynamic ranges of a center part and a surrounding part of the image photographed by an image sensor or the difference of lens resolution.

2. Description of the Related Art

An image sensor refers to a semiconductor device converting an optical image to electric signals. Portable apparatuses (e.g. digital cameras and mobile communication terminals) having an image sensor are now developed and sold. The image sensor consists of arrays of small photo diodes, which are called pixels or photosites. The pixels themselves typically do not extract color from light. The pixels merely convert photos, provided from a wide spectrum band, to electrons. To write color images by using a single sensor, the sensor is filtered such that different pixels can receive different color light. This type of sensor is known as a color filter array (CFA). The different color filters intersect the sensor and are arrayed in a predetermined pattern.

In addition to color filters, the image sensors are equipped with various image filters. Most filters are designed to evenly apply a preset filter coefficient or filter type to an entire image frame. Although an image has different properties for each area, the same settings are applied entirely to one image frame, malting it difficult to effectively express the features of the image.

FIG. 1 illustrates an image of an image sensor and an area thereof having different properties; FIG. 2 illustrates properties of an image for each area; and FIG. 3 illustrates a method of compensating the properties for each area of an image.

Referring to FIG. 1, the properties of an image 100 are typically changed in the direction from a center pixel 110 of a center part toward each of edge pixels 120a, 120b, 120c and 120d (hereinafter, collectively referred to as 120). In other words, portions having similar properties can be distinguished by each of concentric rings 130a, 130b, 130c and 130d.

FIG. 2 shows the brightness, among various properties, according to the position of a pixel in the image 100. A first curve 210 indicates the maximum brightness for each pixel, and a second curve 220 indicates the minimum brightness for each pixel. The first curve 210 and the second curve 220 are brightest in the center pixel 110 and darkest in the edge pixel 120. The first curve 210 and the second curve 220 become less bright as the pixel position is changed from the center pixel to the edge pixel.

If a dynamic range D1 of the center pixel 110 is compared with dynamic ranges D1 and D2 of the edge pixels 120, the dynamic range D1 of the center pixel 110 is wider. Here, the dynamic range refers to the difference between the darkest brightness and the brightest brightness that can be expressed in a pixel. In other words, the wide dynamic range leads to the high resolution, and the narrow dynamic range leads to the low resolution.

If the dynamic range D1 of the center pixel 110 is compared with dynamic ranges D1 and D2 of the edge pixels 120, the difference of up to 30 to 40% occurs depending on the lens property of the image sensor. Also, the image becomes more burred in a surrounding part having the edge pixels 120 than in a center part having the center pixel 110. This is because a beam of light passing through a lens is distorted and the focal point is not uniform. As a result, the edge is expanded and the sharpness is lowered.

For acquiring the dynamic ranges, referring to FIG. 3, the dynamic ranges of the entire image are required to be smoothed based on the dynamic range of the center pixel 110 (referring to a first arrow 310 and a second arrow 320). Accordingly, the dynamic range D2 of the surrounding part (having the edge pixels 120) is changed to D2'. For this, a certain ratio of gain is multiplied or a device performing a lens shading compensation function is used in order to compensate the dynamic ranges of the whole image.

However, in this case, the noise component is also amplified in the surrounding part having the edge pixels 120 due to the expansion of the dynamic ranges. Even if the edge is detected and emphasized, the noise component is also emphasized. Accordingly, the quality of the image 100 is deteriorated. Further, the edge level is smaller in the surrounding part having the edge pixels 120, to thereby lower the sharpness in the surrounding parts of the image 100 and deteriorate the quality of the image 100.

SUMMARY

Accordingly, the present invention provides an image edge detection apparatus and a method thereof, a sharpness emphasis apparatus and a method thereof, and a recoding medium recorded with a program performing the method that can acquire the sharpness and quality of a desired image by detecting an edge of a surrounding part by use of an edge detection filter having a different filter area size and/or a weight of a computed edge value in a center part and the surrounding part, respectively, of the image, and then by giving a weight to the detected edge.

The present invention also provides an image edge detection apparatus and a method thereof, a sharpness emphasis apparatus and a method thereof, and a recoding medium recorded with a program performing the method that can prevent the deterioration of an image by recovering the properties of the original image to the maximum in a center part and area-selectively filtering the decrease of the sharpness caused by the multiplication of a gain in a surrounding part.

To solve the above problems, according to an aspect of the present invention, there can be provided an apparatus for differently detecting an edge according to an area of the image.

According to an embodiment of the present invention, the edge detection apparatus includes a filter area selecting unit, selecting a filter area in which a plurality of adjacent pixels are included around an object pixel; and an edge detection unit, determining an edge value of the object pixel by using pixel data of the plurality of adjacent pixels in the filter area, whereas the filter area selecting unit determines the size of the filter area according to the distance between the object pixel and a center pixel of the image.

According to another embodiment of the present invention, the edge detection apparatus includes a filter area selecting unit, selecting a filter area in which a plurality of adjacent pixels are included around an object pixel; and an edge detection unit, determining an edge value of the object pixel by using pixel data of the plurality of adjacent pixels in the filter area, whereas the edge detection unit determines a weight of the edge value of the object pixel according to the distance between the object pixel and a center pixel of the image. Here, the weight can be determined in accordance with a shading curve of the image.

Also, in the edge detection apparatus, the filter area can be a window having the size of N×N around the object pixel, and N can be a natural number. Here, the N can be determined in accordance with a shading curve of the image.

Also, in the edge detection apparatus, the edge detection unit can be one of a Sobel filter, a Prewitt filter, a Robert filter and a Laplacian filter.

To solve the above problems, according to another aspect of the present invention, there can be provided an apparatus for differently emphasizing the sharpness according to an area of an image.

According to an embodiment of the present invention, the sharpness emphasis apparatus includes an image input unit, receiving an image; an edge detection filter, differently detecting an edge according to an area of the received image; a dynamic range smoothing unit, smoothing a dynamic range of the image; a sharpness enhancement unit, applying the detected edge to the image in which the dynamic range is smoothed; and an image output unit, outputting the image to which the edge is applied.

Here, the edge detection filter includes a filter area selecting unit, selecting a filter area in which a plurality of adjacent pixels are included around an object pixel; and an edge detection unit, determining an edge value of the object pixel by using pixel data of the plurality of adjacent pixels in the filter area, whereas the filter area selecting unit determines the size of the filter area according to the distance between the object pixel and a center pixel of the image.

Alternatively, the edge detection filter includes filter area selecting unit, selecting a filter area in which a plurality of adjacent pixels are included around an object pixel; and an edge detection unit, determining an edge value of the object pixel by using pixel data of the plurality of adjacent pixels in the filter area, whereas the edge detection unit determines a weight of the edge value of the object pixel according to the distance between the object pixel and a center pixel of the image. Here, the weight can be determined in accordance with a shading curve of the image.

Also, in the sharpness emphasis apparatus, the filter area can be a window having the size of N×N around the object pixel and N can be a natural number. Here, the N can be determined in accordance with a shading curve of the image.

Also, in the sharpness emphasis apparatus, the edge detection unit can be one of a Sobel filter, a Prewitt filter, a Robert filter and a Laplacian filter.

To solve the above problems, according to another aspect of the present invention, there can be provided a method of differently detecting an edge according to an area of an image.

According to an embodiment of the present invention, the edge detection method includes (a) selecting an object pixel, an edge of which is to be detected, among pixels of the image; (b) computing the distance between the object pixel and a center pixel of the image; (c) determining the size of a filter area of the object pixel according to the computed distance; and (d) determining an edge value of the object pixel by using pixel data of the plurality of adjacent pixels in the filter area, the size of which is determined.

According to an embodiment of the present invention, the edge detection method includes (a) selecting an object pixel, an edge of which is to be detected, among pixels of the image; (b) computing the distance between the object pixel and a center pixel of the image; (c) determining an edge value of the object pixel by using pixel data of a plurality of adjacent pixels in a filter area of the object pixel; and (d) applying a weight determined according to the computed distance, to the edge value of the object pixel. Here, in the step (d), the weight is determined in accordance with a shading curve of the image.

Preferably, the method can further include, before the step (c), determining the size of the filter area according to the computed distance.

Also, the method can further include (e) repeating the steps (a) through (d) for all pixels of the image or (e) repeating the steps (a) through (d), only for pixels of the image that are spaced greater than a predetermined distance from a center pixel of the image.

Also, in the edge detection method, the filter area can be a window having the size of N×N around the object pixel, and N can be a natural number. The N can be determined in accordance with a shading curve of the image.

To solve the above problems, according to another aspect of the present invention, there can be provided a recording medium tangibly embodying a program of instructions executable by a digital processing apparatus to differently perform the edge detection of a center part and a surrounding part of an image, the recording medium being readable by the digital processing apparatus, the recording medium being recorded with a program performing the method.

To solve the above problems, according to another aspect of the present invention, there can be provided a method of differently emphasizing the sharpness according to an area of an image.

According to an embodiment of the present invention, the sharpness emphasis method includes (a) receiving an image; (b) selecting an object pixel, an edge of which is to be detected, among pixels of the image; (c) computing the distance between the object pixel and a center pixel of the image; (d) determining the size of a filter area of the object pixel according to the computed distance; (e) determining an edge value of the object pixel by using pixel data of the plurality of adjacent pixels in the filter area, the size of which is determined; (f) detecting an edge value by repeating the steps (a) through (d) only for pixels of the image that are spaced greater than a predetermined distance from a center pixel of the image; (g) smoothing a dynamic range of the image; and (h) emphasizing the sharpness differently by applying the edge value detected in the step (f) to the image which has undergone the step (g).

According to an embodiment of the present invention, the sharpness emphasis method includes (a) receiving an image; (b) selecting an object pixel, an edge of which is to be detected, among pixels of the image; (c) computing the distance between the object pixel and a center pixel of the image; (d) determining an edge value of the object pixel by using pixel data of a plurality of adjacent pixels in a filter area of the object pixel; (e) applying the weight, determined according to the computed distance, to the edge value of the object pixel; (f) detecting an edge value by repeating the steps (a) through (d) only for pixels of the image that are spaced greater than a predetermined distance from a center pixel of the image; (g) smoothing a dynamic range of the image; and (h) emphasizing the sharpness differently by applying the edge value detected in the step (f) to the image which has undergone the step (g). Here, in the step (e), the weight is determined in accordance with a shading curve of the image.

Preferably, the method can further include, before the step (d), determining the size of the filter area according to the computed distance Also, in the sharpness emphasis method, the filter area is a window having the size of N×N around the object pixel, and N can be a natural number. The N can be determined in accordance with a shading curve of the image.

To solve the above problems, according to another aspect of the present invention, there can be provided a recording medium tangibly embodying a program of instructions executable by a digital processing apparatus to differently perform the sharpness emphasis of a center part and a surrounding part of an image, the recording medium being readable by the digital processing apparatus, the recording medium being recorded with a program performing the method.

Other problems, certain benefits and new features of the present invention will become more apparent through the following description with reference to the accompanying drawings and some embodiments.

BRIEF DESCRIPTION OF THE DRAWINGS

FIG. 5 is an example illustrating a mask of an edge detection filter in accordance with an embodiment of the present invention;

DETAILED DESCRIPTION

Hereinafter, some embodiments of an image edge detection apparatus and a method thereof a sharpness emphasis apparatus and a method thereof, and a recoding medium recorded with a program performing the method in accordance with the present invention will be described in detail with reference to the accompanying drawings. Throughout the description of the present invention, when describing a certain technology is determined to evade the point of the present invention, the pertinent detailed description will be omitted. Terms (e.g. "first" and "second") used in this description merely are identification for successively identifying identical or similar elements.

In the present invention, an edge refers to an area of an image where color or luminance is suddenly changed. The edge of the image shows information related to position, shape, size and surface design of a subject in the image. The edge is an area having edge brightness that is changed from a low brightness value to a high brightness value or a high brightness value to a low brightness. Since the edge has the considerable difference of the brightness, there is discontinuity of a pixel value or a differential pixel. In the present invention, the edge value includes information related to whether a pertinent pixel is pertained to the edge.

Figure 4:
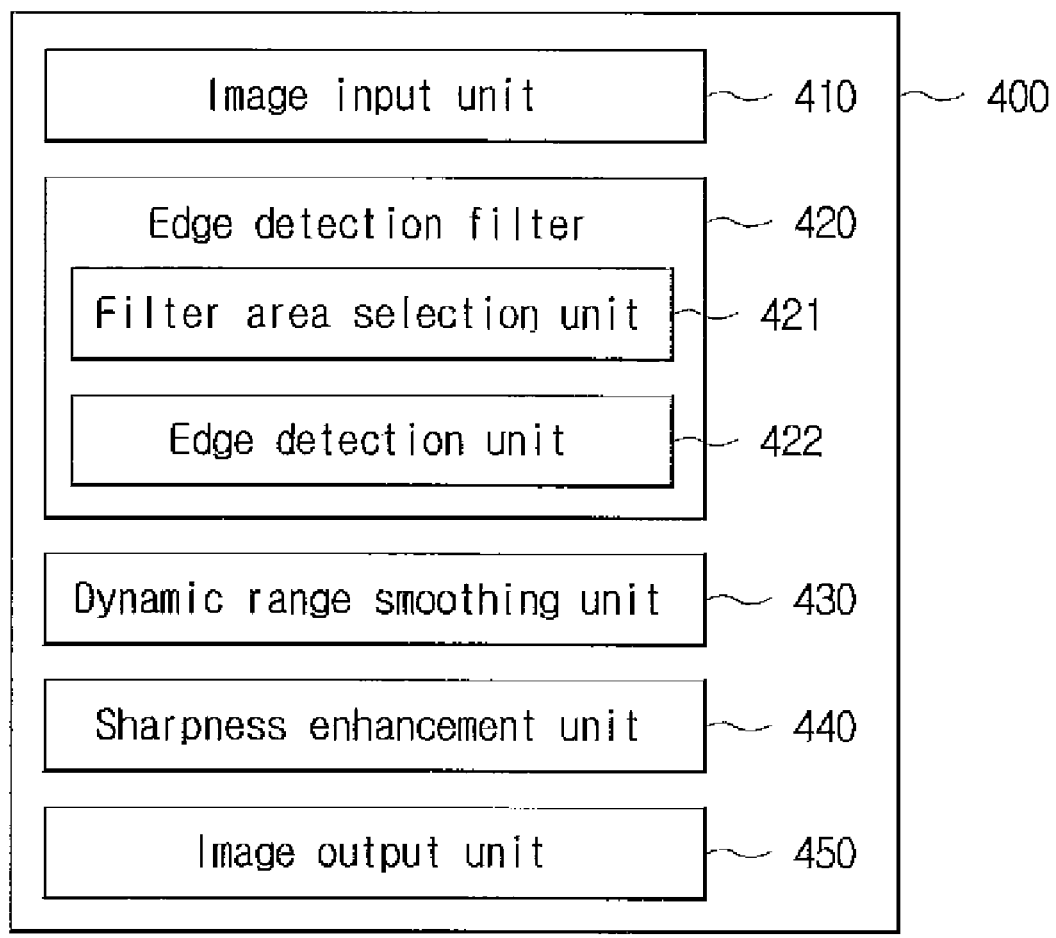
FIG. 4 is a block diagram illustrating a sharpness emphasis apparatus in accordance with an embodiment of the present invention.
Figure 5:
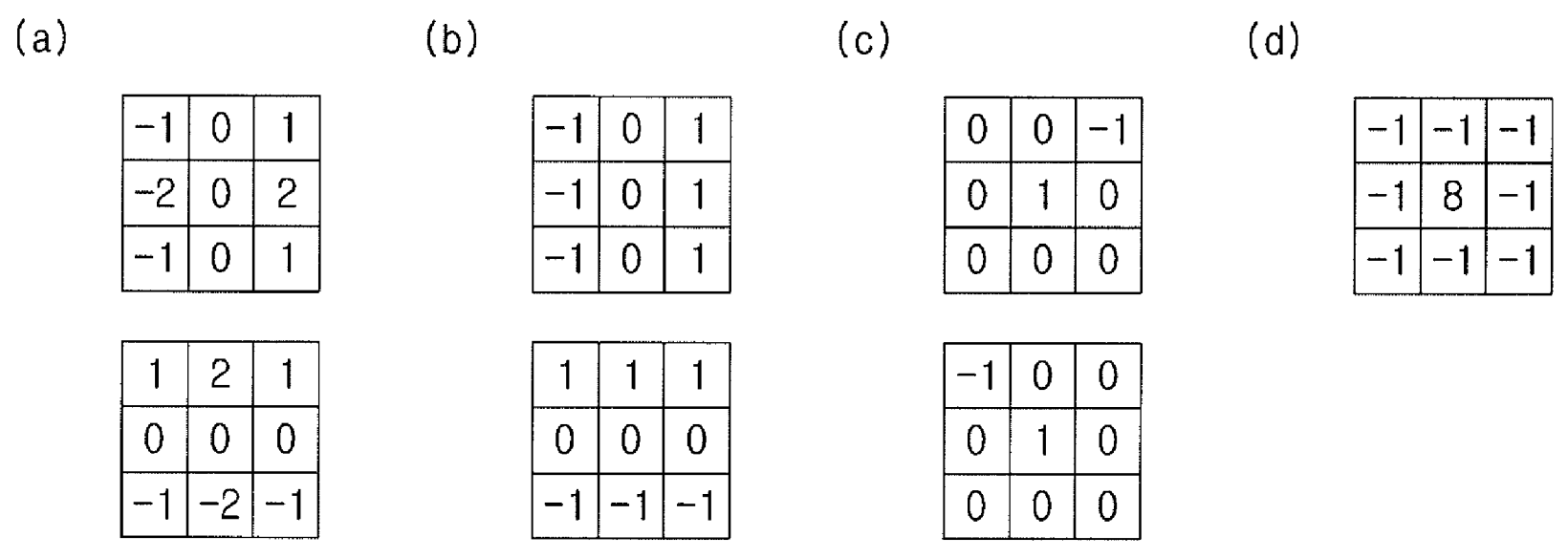

FIG. 4 is a block diagram illustrating a sharpness emphasis apparatus in accordance with an embodiment of the present invention, and FIG. 5 is an example illustrating a mask of an edge detection filter in accordance with an embodiment of the present invention.

The sharpness emphasis apparatus 400 includes an image input unit 410, an edge detection filter 420, a dynamic range smoothing unit 430, a sharpness enhancement unit 440 and an image output unit 450.

The image input unit 410 receives an image photographed by or stored in the image sensor.

The edge detection filter 420, which detects an edge in the inputted image, includes a filter area selection unit 421 and an edge detection unit 422.

The filter area selection unit 421 selects an object pixel for checking whether the object pixel is pertained to an edge. Also, the filter area selection unit 421 sets a filter area for edge detection based on an object pixel.

In order to detect an edge in a pertinent filter area, the filter area selection unit 421 differently sets a filter size and/or a weight of a computed edge value according to the cases of a center part and a surrounding part of an image at which the pertinent object pixel is placed. This is because the sharpness is likely to be lowered from 30 to 40 percents according to the lens property of an image sensor. Since the edge has wider width at the surrounding part than at the center part of the image and the value is not large, it is preferable to adjust the size of the edge detection filter 420 and/or the weight of the computed edge value according to a shading curve.

In other words, the filter area selection unit 421 changes the size of the filter area and the weight of the computed edge value depending on the position relationship between the object pixel of the current filter area for detecting the edge and the center pixel of the image.

The object pixel can be selected according to a predetermined order (e.g. the order of inputting pixels or the direction from the center to the edge) or optionally.

The edge detection unit 422 searches an edge by using the change of a brightness value by a differential operator. The edge detection unit 422 can also evaluate a differential value by using a partial differential operator. Each mask corresponding to the filter area features that the summation of all pixels in the mask is evaluated as zero.

The edge detection unit 422 can be a Sobel filter, a Prewitt filter, a Robert filter and a Laplacian filter, for example.

The Sobel filter, which is a second order differential operator, differentiates with respect to an x-axis and a y-axis, respectively, one time. The magnitude G of a gradient can be represented as G=|Gx|+|Gy| (here, Gx refers to the partial differential with respect to the x-axis, and Gy refers to the partial differential with respect to the y-axis. The mask of the Sobel filter is illustrated in FIG. 5(a).

The Prewitt filter has a response time which is quicker a little to show the nearly same result as the Sobel filter. Although the two filters have similar shaped masks, different weights are given to each of the two filters. Accordingly, when an outline is detected, the outline is allowed to be emphasized less. The mask of the Prewitt filter is illustrated in FIG. 5(b).

The Robert filter, which is very sensible, has a very quick computation speed. The mask of the Robert filter has a shape of 45 degree gradient, which is illustrated in FIG. 5(c).

The Laplacian filter, which has a very quick computation speed and uses the second order differential operator, detects the outline of all directions and the sharper outline than other filters. The Laplacian filter performs the edge detection by using the mask which is illustrated in FIG. 5(d).

Figure 1:
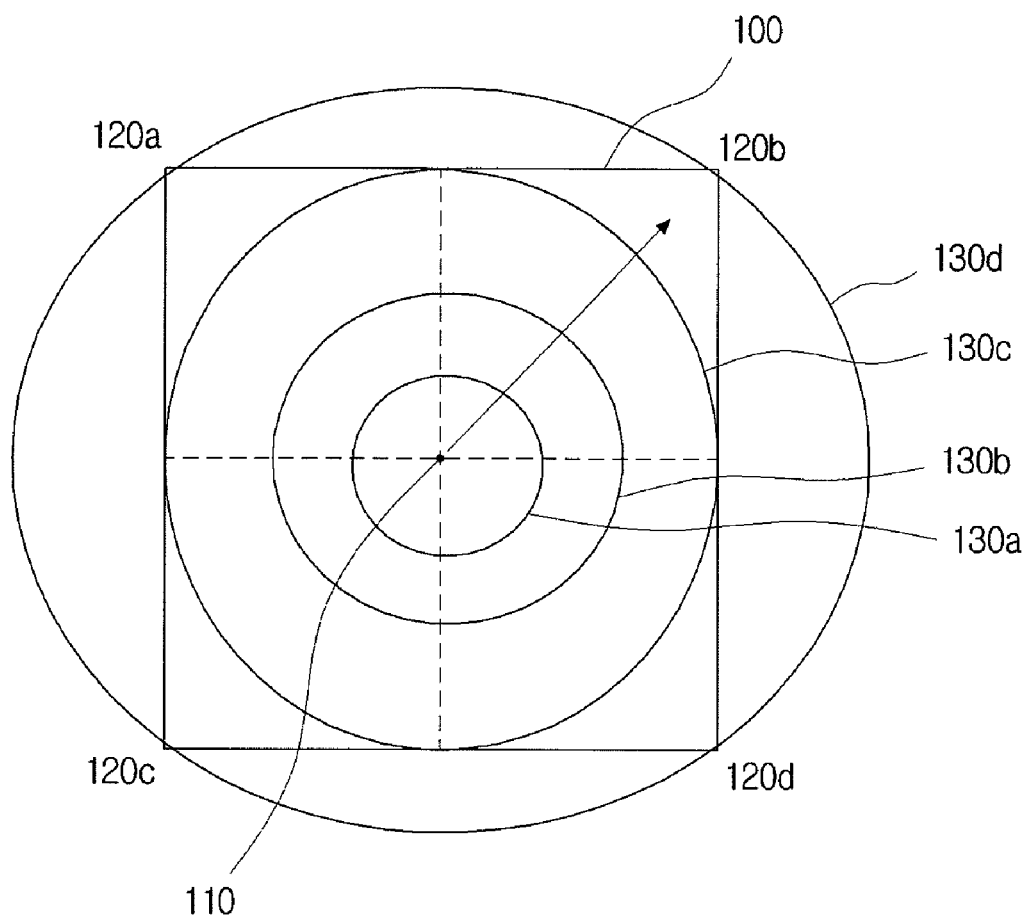
FIG. 1 illustrates an image of an image sensor and an area thereof having different properties.
Figure 2:
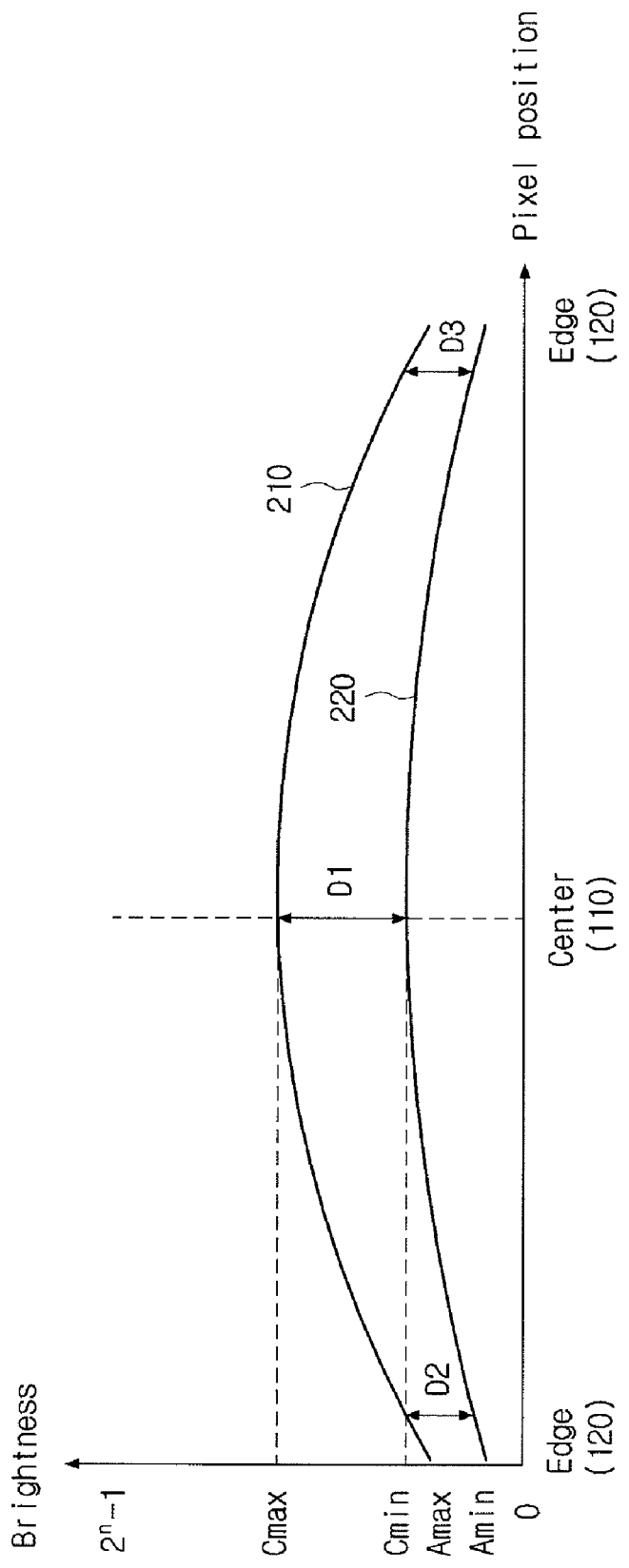
FIG. 2 illustrates properties of an image for each area.
Figure 3:
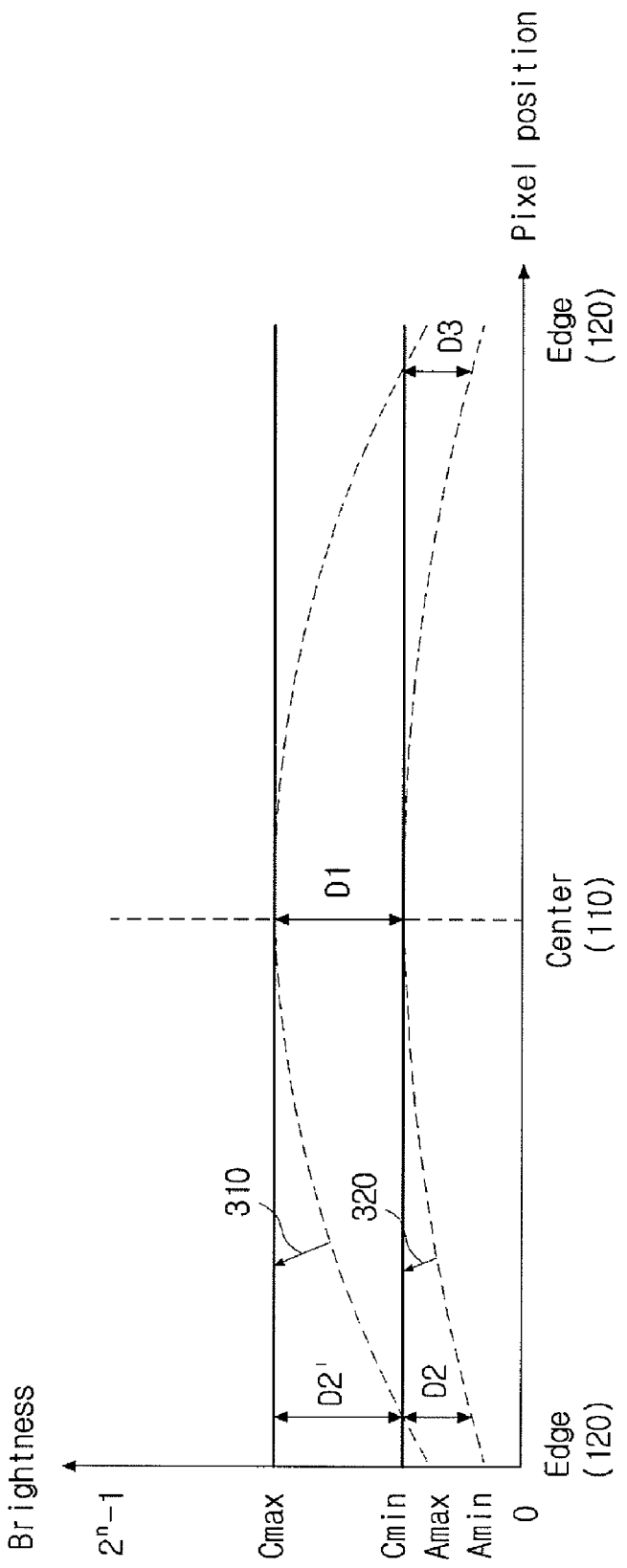
FIG. 3 illustrates a method of compensating properties of an image for each area.

The dynamic range smoothing unit 430 smoothes a dynamic range of a center part and a surrounding part of an image in which an edge is detected. As illustrated FIG. 3, the dynamic range smoothing unit 430 smoothes the dynamic range by changing the dynamic range D2 (=Amax−Amin) of the surrounding part of the image into D2' (=Cmax−Cmin) according to the dynamic range D1 (=Cmax−Cmin) of the center part.

The dynamic range can be expanded by changing the minimum brightness of the surrounding part from Amin to Cmin and the maximum brightness from Amax to Cmax and by linearly computing the brightness between the maximum brightness and the minimum brightness to be evaluated as a value between Cmin and Cmax.

The sharpness enhancement unit 430 enhances the sharpness of an image by applying the edge, detected by the edge detection filter 420, to the image where the dynamic range is smoothed. The sharpness enhancement unit 430 varies the weight of the detected edge by performing the multiplication, addition or subtraction of the detected edge with respect to the image and applies the varied weight to the image. The weight applied for the computed edge value is determined according to the position relationship (e.g. the distance) between the object pixel and the center pixel of the image.

The image output unit 450 outputs the image where the sharpness is enhanced by allowing the dynamic range to be smoothed and the detected edge to be applied.

Hereinafter, the principle and method of allowing the edge detection filter 420 to detect an edge by using a different size and/or a different weight according to the position of an object pixel in an image will be described in detail.

Figure 6:
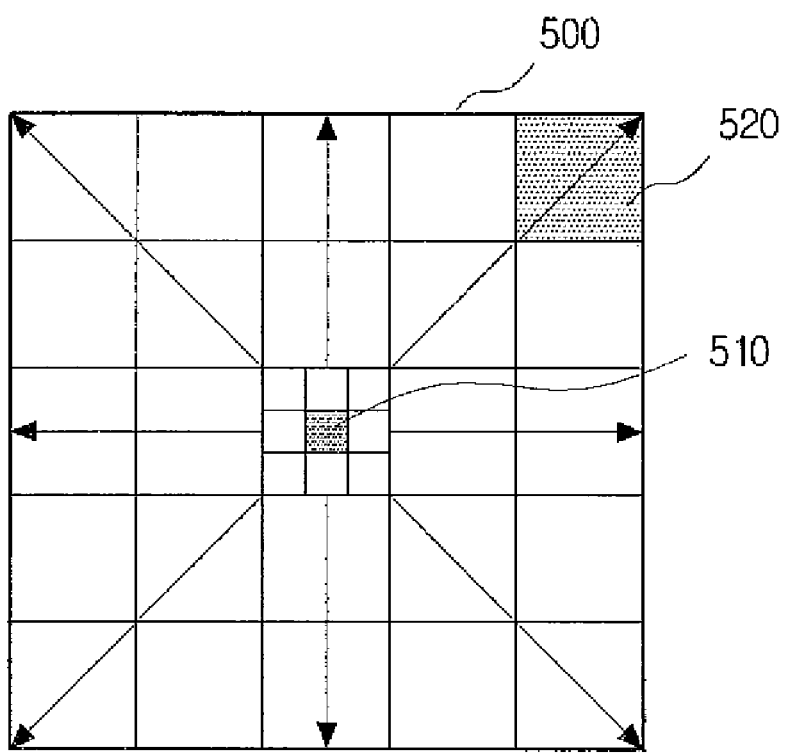
FIG. 6 and FIG. 7 illustrate the size of a filter area according to the position of an object pixel in accordance with an embodiment of the present invention.
Figure 7:
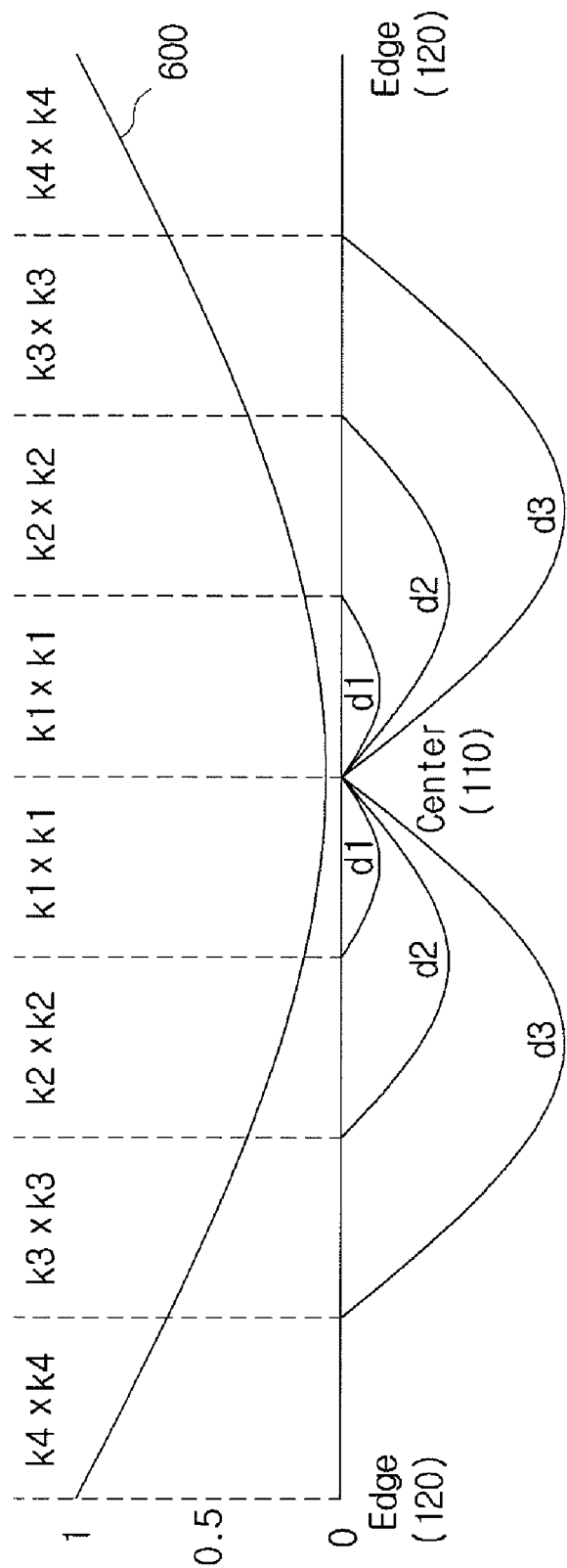

FIG. 6 and FIG. 7 illustrate the size of a filter area according to the position of an object pixel in accordance with an embodiment of the present invention. The edge detection filter 420 has the mask, the size of which is changed according to the size of the filter area.

Referring to FIG. 6, it is preferable that a filter area of object pixels near to a center part 510 of an image 500 has a small size but a filter area of object pixels near to a surrounding part 520 has a larger size. Since the distance between the object pixel and the center pixel becomes wider by allowing the object pixel to be located in the direction of an arrow illustrated in FIG. 6, the size of the filter area is increased in the direction of the arrow.

For example, referring to FIG. 7, the object pixels in a certain distance based on the center pixel 110 of the image has the same sized filter areas.

The object pixels in a distance d1 based on the center pixel has a k1×k1 sized filter area, the object pixels in a distance d2 based on the center pixel has a k2×k2 sized filter area, the object pixels in a distance d3 based on the center pixel has a k3×k3 sized filter area and the object pixels placed beyond the distance d3 based on the center pixel has a k4×k4 sized filter area.

As a shading curve 600 for compensating lens shading goes toward edge parts based on a center pixel, the shading curve 600 gradually has a larger value. A recent portable apparatus has the trends toward slim appearance and miniaturization, which mean all sensor modules become slim and compact. Accordingly, a corresponding image sensor equipped in the portable apparatus is required to have the high resolution. As a result, enough distance is not acquired between a lens and a photographed surface. The brightness of the lens is not bright enough. The permeability of the lens is not uniform. In particular, there eminently appears a lens shading phenomenon, which the more distant the lens is toward an outside, the less the amount of light becomes. As it is getting more distant toward the outside based on the center pixel, it becomes dark due to reducing the amount of light. Accordingly, as shown in FIG. 7, the shading curve 600 has a convex shape toward the bottom showing that a compensation value becomes increasing as it is getting close to the edge part in order to suitably compensate the brightness of the whole image.

The size of the filter area is adjustable depending on the shading curve 600. Since the shading curve 600 functions to compensate the brightness of pixels, it can be inferred that the larger a compensation value of the shading curve 600, the larger gain is multiplied to compensate the brightness of pixels. As a result, the noise is amplified together and the width of the edge becomes wide. To filter the noise, the size of filter area is required to be increased. Accordingly, if the filter area is a regular square, as illustrated in FIG. 7, k1, k2, k3 and k4 satisfy the following formula 1.

$$k1 \leq k2 \leq k3 \leq k4 \qquad \text{[Formula 1]}$$

Here, k1, k2, k3 and k4 are natural numbers. The noise filtering can be differently performed in the center part and the edge part of the image by adjusting a filter coefficient in the filter area in addition to the size of the filter area In other words, since the position of the object pixel is changed from the center part to the adjacent part of the image, although the size of the filter area is the same, the edge detection level can be adjusted by changing the weight of the computed edge value.

Since the width of the edge is relatively wide and is not sharply, the computation process can be simplified by performing neither the foresaid edge detection nor sharpness emphasis of the center part of the image. In other words, the edge detection and sharpness emphasis according to the foregoing sharpness emphasis method is not performed for the object pixels in a certain distance based on the center pixel of the image, but the edge detection and sharpness emphasis according to the foregoing sharpness emphasis method is performed for the object pixels placed beyond a certain distance.

In accordance with another embodiment of the present invention, the filter area for performing the edge detection and sharpness emphasis of the object pixel can have the size and the weight of the computed edge value, which are changed together.

Figure 8:
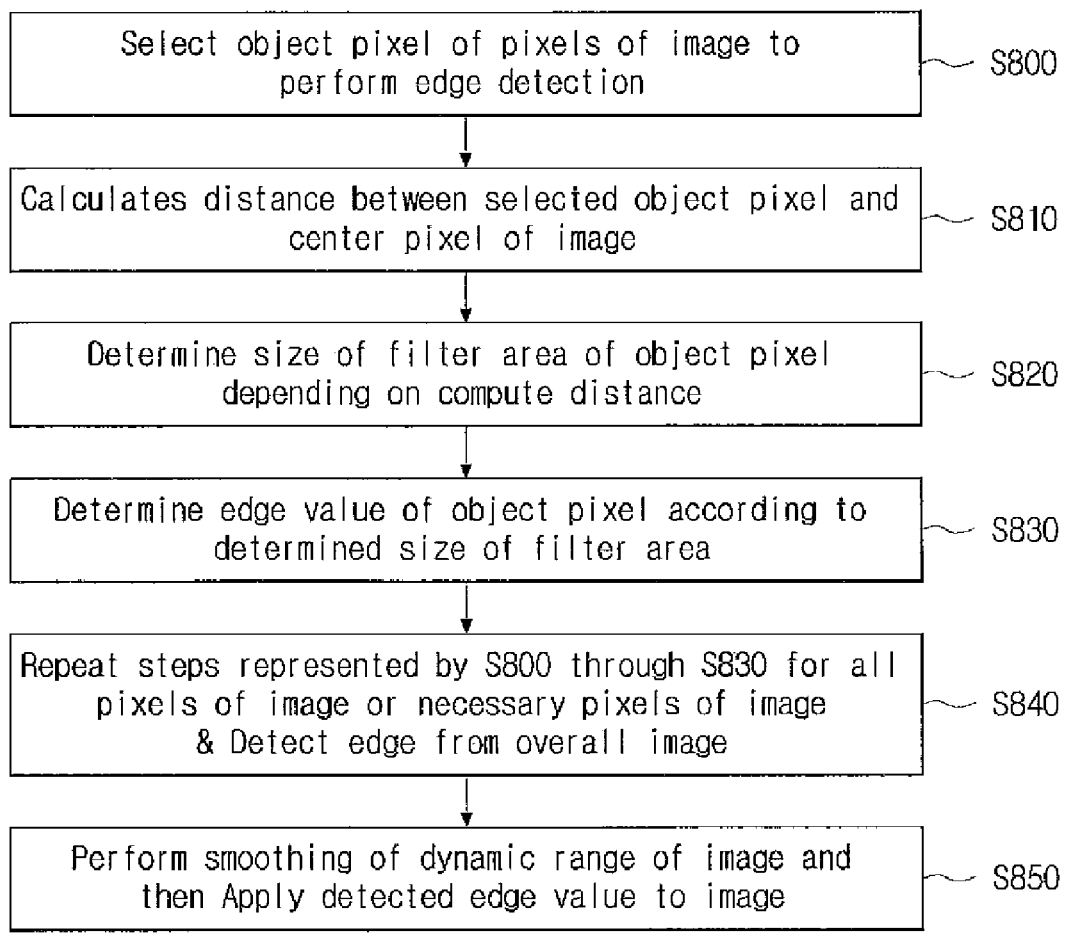
FIG. 8 is a flow chart illustrating an edge detection method and a sharpness emphasis method in accordance with an embodiment of the present invention.

FIG. 8 is a flow chart illustrating an edge detection method and a sharpness emphasis method in accordance with an embodiment of the present invention.

Below is described the edge detection method.

A step represented by S800 selects an object pixel of pixels of an image to perform the edge detection. The selection of the object pixel can be performed optionally or according to a predetermined order.

A step represented by S810 calculates the distance between the selected object pixel and a center pixel of the image. The distance between the selected object pixel and the center pixel can be computed by various methods.

A step represented by S820 determines the size of the filter area of the object pixel depending on the compute distance. Since the size of the filter area has been already described above in detail, the detailed pertinent description will be omitted.

A step represented by S830 determines an edge value of the object pixel according to the determined size of the filter area.

A step represented by S840 detects an edge value of each pixel of the overall image by repeating the steps represented by S800 through S830 for all pixels of the image or necessary pixels of the image. In the case of the pixels placed in the center part of the image, it may not necessary to perform the edge detection. In other words, the edge detection is not required to be performed.

The sharpness emphasis method will be described by adding the below steps into the forgoing steps.

A step represented by S850 performs the smoothing of a dynamic range of the image and then applies the detected edge value to the image. Through this, the sharpness, which has been lowered in the surrounding part of the image, is enhanced by smoothing the dynamic range.

Figure 9:
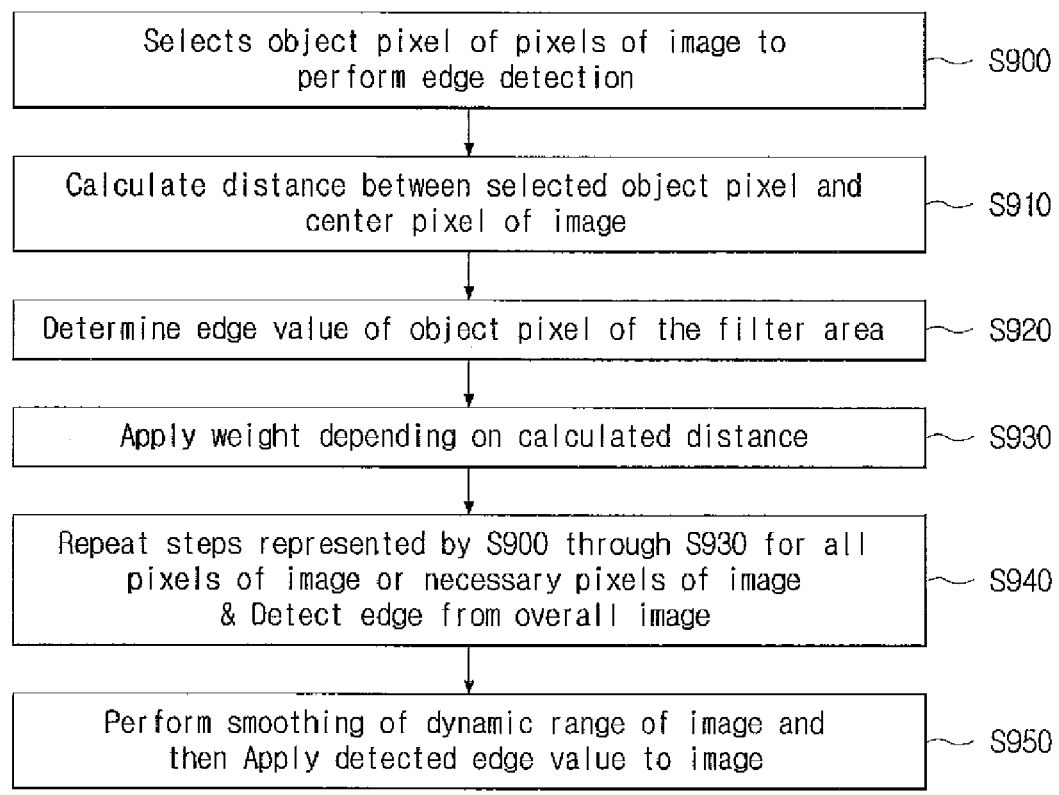
FIG. 9 is a flow chart illustrating an edge detection method and a sharpness emphasis method in accordance with another embodiment of the present invention.

FIG. 9 is a flow chart illustrating an edge detection method and a sharpness emphasis method in accordance with another embodiment of the present invention.

Below is described the edge detection method.

A step represented by S900 selects an object pixel of pixels of an image to perform the edge detection. The selection of the object pixel can be performed optionally or according to a predetermined order.

A step represented by S910 calculates the distance between the selected object pixel and a center pixel of the image. The distance between the selected object pixel and the center pixel can be computed by various methods.

A step represented by S920 determines an edge value of the object pixel by using pixel data of adjacent pixels of the filter area of the object pixel.

A step represented by S930 determines a weight of the edge value of the object pixel depending on the distance, computed in the step represented by S910, and applies the weight to the edge value of the object pixel.

A step represented by S940 detects an edge value, applied with the weight, of each pixel of the overall image by repeating the steps represented by S900 through S930 for all pixels of the image or necessary pixels of the image. In the case of the pixels placed in the center part of the image, it may not necessary to perform the edge detection. In other words, the edge detection is not required to be performed.

The sharpness emphasis method will be described by adding the below steps into the forgoing steps.

A step represented by S950 performs the smoothing of a dynamic range of the image and then applies the detected edge value to the image. Through this, the sharpness, which has been lowered in the surrounding part of the image, is enhanced by smoothing the dynamic range.

Here, the weight application according to the distance computed in the step represented by S910 can be performed in the step represented by 950 instead of the step represented by S930. In other words, if an edge value of all pixels of the image or some pixels of the image is detected and then is applied to emphasize the sharpness of the image, the weight can be applied.

In accordance with another embodiment of the present invention, a recording medium tangibly embodying a program of instructions executable by a digital processing apparatus in order to differently perform the edge detection of a center part and a surrounding part of an image, the recording medium being readable by the digital processing apparatus, is recorded with a program performing the image edge detection method of the foregoing steps represented by S800 through S840, by which the edge detection is performed. Alternatively, the recording medium is recorded with a program performing the image edge detection method of the foregoing steps represented by S900 through S940, by which the edge detection is performed.

In accordance with another embodiment of the present invention, a recording medium tangibly embodying a program of instructions executable by a digital processing apparatus in order to differently perform the sharpness emphasis of a center part and a surrounding part of an image, the recording medium being readable by the digital processing apparatus, is recorded with a program performing the image edge detection method of the foregoing steps represented by S800 through S850, by which the sharpness emphasis is performed. Alternatively, the recording medium is recorded with a program performing the image edge detection method of the foregoing steps represented by S900 through S950, by which the sharpness emphasis is performed.

As described above, in accordance with an embodiment of the present invention, an image edge detection apparatus and a method thereof, a sharpness emphasis apparatus and a method thereof and a recoding medium recorded with a program performing the method can acquire the sharpness and quality of a desired image by detecting an edge of a surrounding part by use of an edge detection filter having a different filter area size and/or a weight of a computed edge value in a center part and the surrounding part, respectively, of the image, and then by giving a weight to the detected edge.

The present invention can also prevent the deterioration of an image by recovering the features of the original image in a center part and area-selectively filtering the decrease of the sharpness caused by the multiplication of a gain in a surrounding part.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. An apparatus for differently detecting an edge according to an area of an image, the apparatus comprising:
   a filter area selecting unit, selecting a filter area in which a plurality of adjacent pixels are included around an object pixel; and
   an edge detection unit, determining an edge value of the object pixel by using pixel data of the plurality of adjacent pixels in the filter area,
   wherein the filter area selecting unit determines a size of the filter area according to a distance between the object pixel and a center pixel of the image, and
   the edge detection unit determines a weight of the edge value of the object pixel according to the distance between the object pixel and the center pixel of the image.

2. The apparatus of claim 1, wherein the weight is determined in accordance with a shading curve of the image.

3. The apparatus of claim 1, wherein the filter area is a window having the size of N×N around the object pixel, N being a natural number, and the N is determined in accordance with a shading curve of the image.

4. An apparatus for differently emphasizing a sharpness according to an area of an image, the apparatus comprising:
   an image input unit, receiving the image;
   an edge detection filter, differently detecting an edge according to an area of the received image;
   a dynamic range smoothing unit, smoothing a dynamic range of the image;
   a sharpness enhancement unit, applying the detected edge to the image in which the dynamic range is smoothed; and an image output unit, outputting the image to which the edge is applied, wherein the edge detection filter includes:

a filter area selecting unit, selecting a filter area in which a plurality of adjacent pixels are included around an object pixel; and an edge detection unit, determining an edge value of the object pixel by using pixel data of the plurality of adjacent pixels in the filter area, and wherein the filter area selecting unit determines a size of the filter area according to a distance between the object pixel and a center pixel of the image.

5. The apparatus of claim 4, wherein the edge detection unit determines a weight of the edge value of the object pixel according to the distance between the object pixel and the center pixel of the image.

6. The apparatus of claim 5 wherein the weight is determined in accordance with a shading curve of the image.

7. The apparatus of claim 4, wherein the filter area is a window having the size of N×N around the object pixel, N being a natural number, and the N is determined in accordance with a shading curve of the image.

8. A method of differently detecting an edge according to an area of an image, the method comprising:

(a) selecting an object pixel, an edge of which is to be detected, among pixels of the image;

(b) computing a distance between the object pixel and a center pixel of the image;

(c) determining a size of a filter area of the object pixel according to the computed distance;

(d) determining an edge value of the object pixel by using pixel data of a plurality of adjacent pixels in the filter area, the size of which is determined; and (e) repeating the steps (a) through (d) for all pixels of the image or for pixels of the image that are spaced greater than a predetermined distance from the center pixel of the image.

9. The method of claim 8, wherein the filter area is a window having the size of N×N around the object pixel, N being a natural number, and the N is determined in accordance with a shading curve of the image.

10. A method of differently detecting an edge according to an area of an image, the method comprising:

(a) selecting an object pixel, an edge of which is to be detected, among pixels of the image;

(b) computing a distance between the object pixel and a center pixel of the image;

(c) determining an edge value of the object pixel by using pixel data of a plurality of adjacent pixels in a filter area of the object pixel; and (d) applying a weight determined according to the computed distance, to the edge value of the object pixel, wherein the weight is determined in accordance with a shading curve of the image, and the method further includes, before the step (c), determining a size of the filter area according to the computed distance.

11. The method of claim 10, further comprising (e) repeating the steps (a) through (d) for all pixels of the image or for pixels of the image that are spaced greater than a predetermined distance from a center pixel of the image.

12. The method of claim 10, wherein the filter area is a window having the size of N×N around the object pixel, N being a natural number, and the N is determined in accordance with a shading curve of the image.

13. A method of differently emphasizing a sharpness according to an area of an image, the method comprising:

(a) receiving an image;

(b) selecting an object pixel, an edge of which is to be detected, among pixels of the image;

(c) computing a distance between the object pixel and a center pixel of the image;

(d) determining a size of a filter area of the object pixel according to the computed distance;

(e) determining an edge value of the object pixel by using pixel data of a plurality of adjacent pixels in the filter area, the size of which is determined;

(f) detecting an edge value by repeating the steps (a) through (d) only for pixels of the image that are spaced greater than a predetermined distance from the center pixel of the image;

(g) smoothing a dynamic range of the image; and (h) emphasizing the sharpness differently by applying the edge value detected in the step (f) to the image which has undergone the step (g).

14. The method of claim 13, wherein the filter area is a window having the size of N×N around the object pixel, N being a natural number, and the N is determined in accordance with a shading curve of the image.

15. A method of differently emphasizing a sharpness according to an area of an image, the method comprising:

(a) receiving an image;

(b) selecting an object pixel, an edge of which is to be detected, among pixels of the image;

(c) computing a distance between the object pixel and a center pixel of the image;

(d) determining an edge value of the object pixel by using pixel data of a plurality of adjacent pixels in a filter area of the object pixel;

(e) applying a weight, determined according to the computed distance, to the edge value of the object pixel;

(f) detecting an edge value by repeating the steps (a) through (d) only for pixels of the image that are spaced greater than a predetermined distance from the center pixel of the image;

(g) smoothing a dynamic range of the image; and (h) emphasizing the sharpness differently by applying the edge value detected in the step (f) to the image which has undergone the step (g).

16. The method of claim 15, wherein, in the step (e) weight is determined in accordance with a shading curve of the image.

17. The method of claim 15, wherein, before the step (d), further comprising determining a size of the filter area according to the computed distance.

18. The method of claim 15, wherein the filter area is a window having the size of N×N around the object pixel, N being a natural number, and the N is determined in accordance with a shading curve of the image.

19. A non-transitory recording medium tangibly embodying a program of instructions executable by a digital processing apparatus to differently perform an edge detection of a center part and a surrounding part of an image, the non-transitory recording medium being readable by the digital processing apparatus, the non-transitory recording medium being recorded with a program executing the steps comprising:

(a) selecting an object pixel, an edge of which is to be detected, among pixels of the image;

(b) computing a distance between the object pixel and a center pixel of the image;

(c) determining a size of a filter area of the object pixel according to the computed distance; and (d) determining an edge value of the object pixel by using pixel data of a plurality of adjacent pixels in the filter area, the size of which is determined.

20. A non-transitory recording medium tangibly embodying a program of instructions executable by a digital processing apparatus to differently perform the edge detection of a center part and a surrounding part of an image, the non-transitory recording medium being readable by the digital processing apparatus, the non-transitory recording medium being recorded with a program executing the steps comprising:
   (a) selecting an object pixel, an edge of which is to be detected, among pixels of the image;
   (b) computing a distance between the object pixel and a center pixel of the image;
   (c) determining an edge value of the object pixel by using pixel data of a plurality of adjacent pixels in a filter area of the object pixel; and
   (d) applying a weight determined according to the computed distance, to the edge value of the object pixel.

21. A non-transitory recording medium tangibly embodying a program of instructions executable by a digital processing apparatus to differently perform the sharpness emphasis of a center part and a surrounding part of an image, the non-transitory recording medium being readable by the digital processing apparatus, the non-transitory recording medium being recorded with a program executing the steps comprising:
   (a) receiving an image;
   (b) selecting an object pixel, an edge of which is to be detected, among pixels of the image;
   (c) computing a distance between the object pixel and a center pixel of the image;
   (d) determining a size of a filter area of the object pixel according to the computed distance;
   (e) determining an edge value of the object pixel by using pixel data of a plurality of adjacent pixels in the filter area, the size of which is determined;
   (f) detecting an edge value by repeating the steps (a) through (d) only for pixels of the image that are spaced greater than a predetermined distance from the center pixel of the image;
   (g) smoothing a dynamic range of the image; and
   (h) emphasizing a sharpness differently by applying the edge value detected in the step (f) to the image which has undergone the step (g).

22. A non-transitory recording medium tangibly embodying a program of instructions executable by a digital processing apparatus to differently perform a sharpness emphasis of a center part and a surrounding part of an image, the non-transitory recording medium being readable by the digital processing apparatus, the non-transitory recording medium being recorded with a program executing the steps comprising:
   (a) receiving an image;
   (b) selecting an object pixel, an edge of which is to be detected, among pixels of the image;
   (c) computing a distance between the object pixel and a center pixel of the image;
   (d) determining an edge value of the object pixel by using pixel data of a plurality of adjacent pixels in a filter area of the object pixel;
   (e) applying a weight, determined according to the computed distance, to the edge value of the object pixel;
   (f) detecting an edge value by repeating the steps (a) through (d) only for pixels of the image that are spaced greater than a predetermined distance from the center pixel of the image;
   (g) smoothing a dynamic range of the image; and
   (h) emphasizing a sharpness differently by applying the edge value detected in the step (f) to the image which has undergone the step (g).

* * * * *